United States Patent
Lee et al.

(10) Patent No.: US 7,479,298 B2
(45) Date of Patent: Jan. 20, 2009

(54) OPTICAL ELEMENT AND METHOD FOR MAKING THE SAME

(75) Inventors: Mao-Song Lee, Hsin Chu (TW); Hsi-Hsin Shih, Taichung (TW); Shih-Kai Cheng, Yi Lan (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 159 days.

(21) Appl. No.: 11/513,194

(22) Filed: Aug. 31, 2006

(65) Prior Publication Data
US 2007/0054096 A1    Mar. 8, 2007

(30) Foreign Application Priority Data
Sep. 5, 2005 (CN) .................... 2005 1 0098634

(51) Int. Cl.
*B05D 5/06* (2006.01)
(52) U.S. Cl. .................... 427/162; 427/163.1
(58) Field of Classification Search ................ 427/162, 427/163, 1, 163.4
See application file for complete search history.

(56) References Cited

U.S. PATENT DOCUMENTS

| | | | |
|---|---|---|---|
| 2004/0235406 A1* | 11/2004 | Duescher | 451/527 |
| 2006/0050387 A1* | 3/2006 | Arakawa et al. | 359/491 |
| 2006/0132945 A1* | 6/2006 | Sano | 359/883 |

* cited by examiner

*Primary Examiner*—Alain L Bashore
(74) *Attorney, Agent, or Firm*—Davidson Berquist Jackson & Gowdey, LLP

(57) ABSTRACT

A method for forming an optical element includes: preparing an optical substrate; coating a curable resin on the optical substrate so as to form a curable resin layer on the optical substrate; embossing the curable resin layer so as to form a plurality of adjoining pointed micro-protrusions, each of which has a tip end; heating the pointed micro-protrusions of the curable resin layer in such a manner that the tip end of each of the pointed micro-protrusions is softened and is spread over the remainder of the respective one of the pointed micro-protrusions so as to form the adjoining pointed micro-protrusions into adjoining rounded micro-protrusions which cooperatively form a continuous curved surface; and curing the curable resin layer.

5 Claims, 3 Drawing Sheets

OPTICAL ELEMENT AND METHOD FOR MAKING THE SAME

CROSS-REFERENCE TO RELATED APPLICATION

This application claims priority of Chinese Application No. 200510098634.6, filed on Sep. 5, 2005.

BACKGROUND OF THE INVENTION

1. Field of the Invention

This invention relates to an optical element and a method for making the same, more particularly to an optical element and a method involving forming a resin layer with a plurality of adjoining protrusions using a press-molding plate for making the optical element.

2. Description of the Related Art

A backlight module is one of the key components for making a liquid crystal display, and serves to provide a uniform light source for enabling the display of an image on a liquid crystal panel. Based on the disposition of the light source, backlight modules can be classified into a bottom lighting type and a side lighting type. The side lighting type normally includes a light guide and optical elements, such as diffusing sheets and brightness-enhancing sheets, for transforming the light emerging from the light guide into a uniform light to be cast onto a liquid crystal panel. The bottom lighting type normally includes a diffuser plate and optical elements, such as diffusing sheets and brightness-enhancing sheets, for enhancing the uniformity and brightness of the light emerging from the diffuser plate.

FIG. 1 illustrates a conventional optical element 1 for a bottom lighting type backlight module. The conventional optical element 1 includes a diffuser plate 11 and a plurality of spaced apart protrusions 12 formed on the diffuser plate 11 for concentrating the light emerging from the diffuser plate 11. In order to smoothen the light concentrated by the protrusions 12, the top surface 121 of each of the protrusions 12 is curved.

Manufacture of the optical element 1 involves the steps of: preparing the diffuser plate 11; coating a curable resin on the diffuser plate 11 so as to form a curable resin layer; curing and hardening the curable resin layer using a UV light or an E-beam; patterning and etching the hardened resin layer so as to form the protrusions 12; and heating and softening the protrusions 12 so as to form the curved top surface 121 of each of the protrusions 12. The softening temperature depends on the material of the curable resin, and is about 55° C. for epoxy resin or acrylic resin.

However, since the protrusions 12 are spaced apart from each other, a portion of the light emerging from the diffuser plate 11 passes through the protrusions 12, and the remainder of the light by-passes the protrusions 12. As a consequence, the light passing through the protrusions 12 and the light by-passing the protrusions 12 differ in intensity and direction, which results in a non-uniform light beam when projected onto an adjacent optical component.

SUMMARY OF THE INVENTION

Therefore, the object of the present invention is to provide an optical element and a method for making the same that can overcome the aforesaid drawback of the prior art.

According to one aspect of this invention, there is provided a method for making an optical element. The method comprises: preparing an optical substrate; coating a curable resin on the optical substrate so as to form a curable resin layer on the optical substrate; embossing the curable resin layer so as to form a plurality of adjoining pointed micro-protrusions, each of which has a tip end; heating the pointed micro-protrusions of the curable resin layer in such a manner that the tip end of each of the pointed micro-protrusions is softened and is spread over the remainder of the respective one of the pointed micro-protrusions so as to form the adjoining pointed micro-protrusions into adjoining rounded micro-protrusions which cooperatively form a continuous curved surface; and curing the curable resin layer.

According to another aspect of this invention, there is provided an optical element that comprises: an optical substrate; and a resin layer formed on the optical substrate and formed with a plurality of adjoining rounded micro-protrusions that cooperatively define a continuous curved surface opposite to the optical substrate.

BRIEF DESCRIPTION OF THE DRAWING

Other features and advantages of the present invention will become apparent in the following detailed description of the preferred embodiment of this invention, with reference to the accompanying drawing, in which.

DETAILED DESCRIPTION OF THE PREFERRED EMBODIMENT

Figure 1:
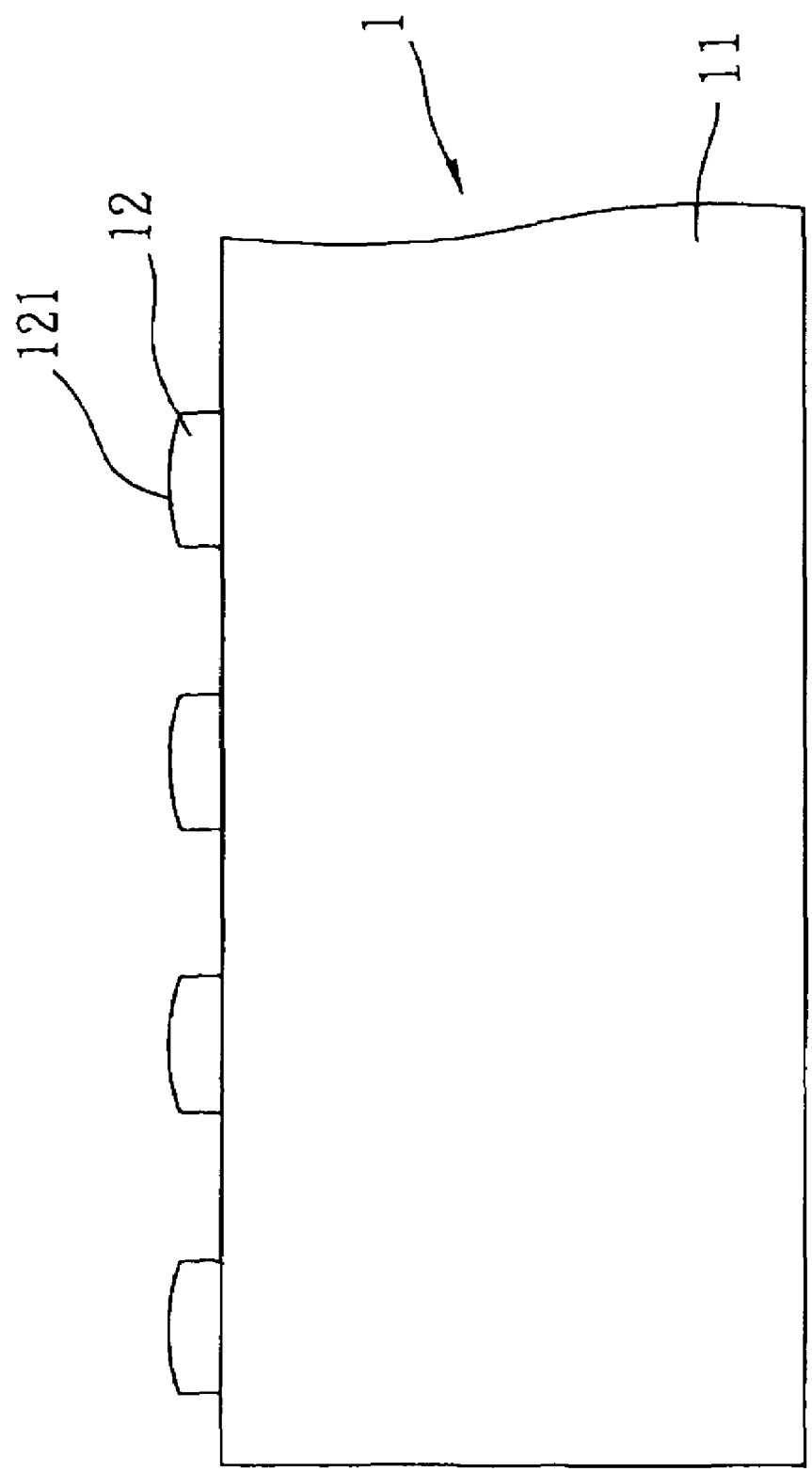
FIG. 1 is a fragmentary schematic view of a conventional optical element for a backlight module of a liquid crystal display.
Figure 2:
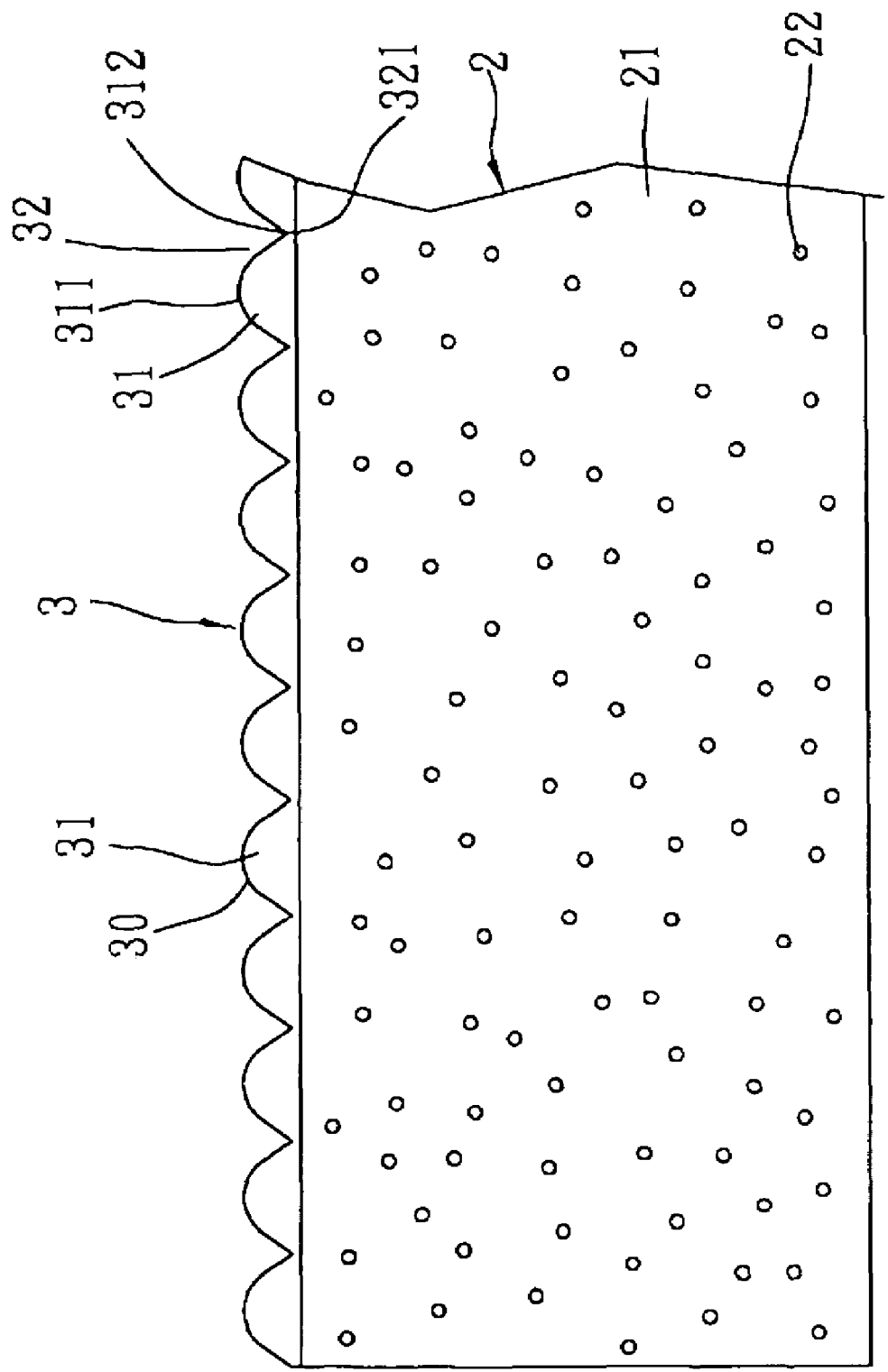
FIG. 2 is a fragmentary schematic view of the preferred embodiment of an optical element for a backlight module of a liquid crystal display according to this invention.

FIG. 2 illustrates the preferred embodiment of an optical element that can be used as a diffuser plate or a brightness-enhancing sheet for a backlight module of a liquid crystal display, a reflective plate, an optical plate for holo-photograph use, or the like.

The optical element includes: an optical substrate 2; and a hardened resin layer 3 formed on the optical substrate 2 and formed with a plurality of adjoining rounded micro-protrusions 31 that cooperatively define a continuous curved surface 30 opposite to the optical substrate 2.

In this embodiment, each of the rounded micro-protrusions 31 has top and bottom ends 311, 312, and cooperates with adjacent ones of the rounded micro-protrusions 31 to define a recess 32 thereamong. The recess 32 is tapered from the top ends 311 of the respective ones of the rounded micro-protrusions 31 to the bottom ends 312 of the respective ones of the rounded micro-protrusions 31 to form a vertex 321.

The optical substrate 2 functions as a diffuser plate in this embodiment, and includes a matrix 21 and a plurality of diffusing particles 22 dispersed in the matrix 21 so as to exhibit a light scattering effect. The matrix 21 is preferably made from a material selected from the group consisting of polycarbonate, polyester, cyclo-olefin copolymer, and polymethylmethacrylate.

The hardened resin layer 3 is preferably made from a resin material selected from the group consisting of acrylic, epoxy, acrylic-epoxy, polyurethane, and silicone.

Figure 3:
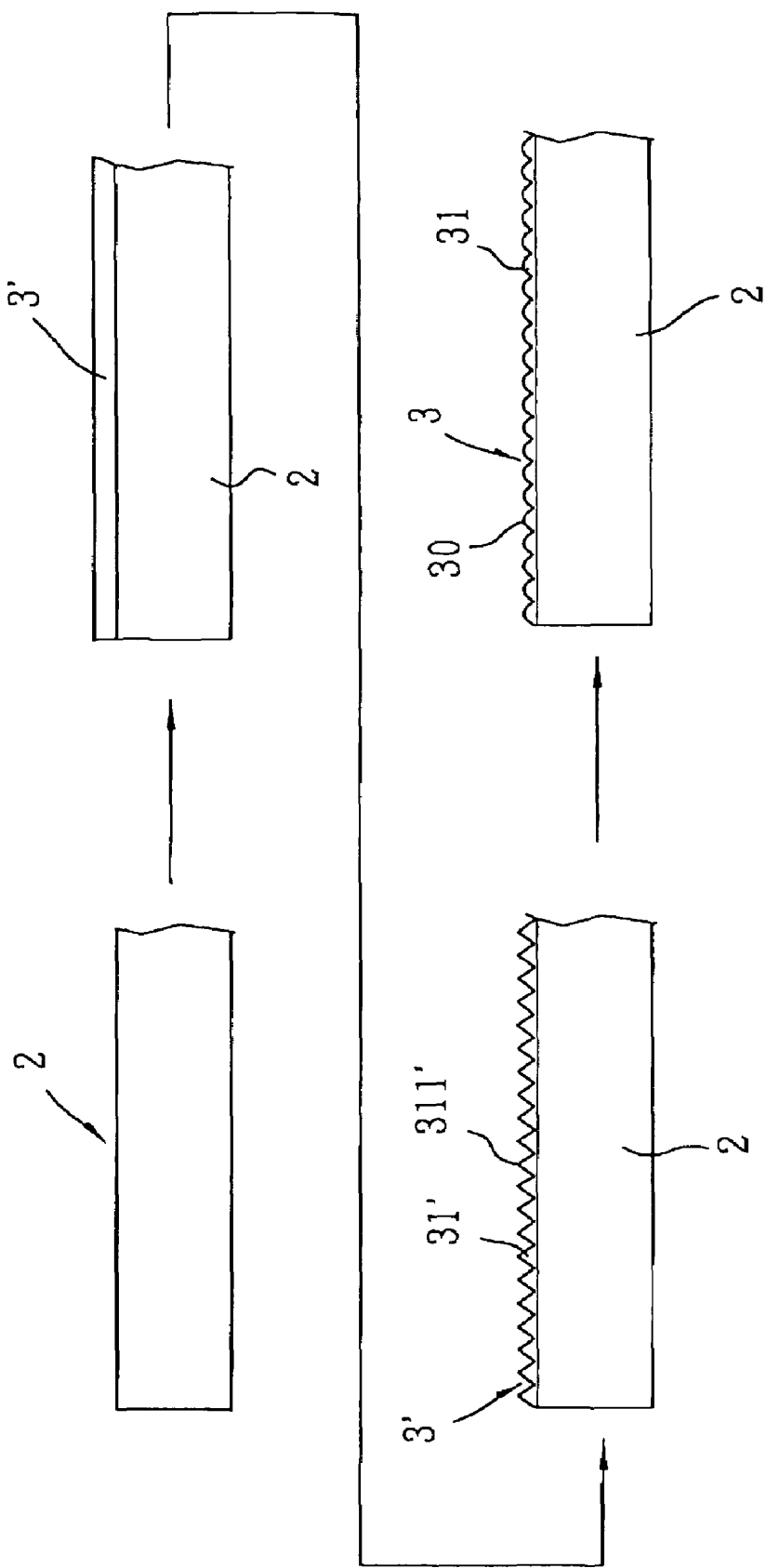
FIG. 3 is a schematic view illustrating consecutive steps of a method for making the preferred embodiment according to this invention.

FIG. 3 illustrates consecutive steps of a method for making the optical element of the preferred embodiment according to this invention.

The method includes the steps of: preparing the optical substrate 2; coating a curable resin on the optical substrate 2 so as to form a curable resin layer 3' on the optical substrate 2; embossing the curable resin layer 3' so as to form a plurality of adjoining pointed micro-protrusions 31', each of which has a tip end 311'; heating the pointed micro-protrusions 31', of the curable resin layer 3' in such a manner that the tip end 311' of each of the pointed micro-protrusions 31' is softened and is spread over the remainder of the respective one of the pointed micro-protrusions 31' so as to form the adjoining pointed micro-protrusions 31' into adjoining rounded micro-protrusions 31 which cooperatively form the continuous curved surface 30; and curing the curable resin layer 3' so as to harden the same to form the hardened resin layer 3 with the rounded micro-protrusions 31.

The coating of the curable resin can be conducted in a conventional manner such as spinning coating using a Carma coater, rollar coating using a roller coater, and die coating using a die coater, and is preferably conducted using the roller coater.

In this embodiment, the embossing of the curable resin layer 3' is conducted using a press-molding plate (not shown) which has a recessed pressing surface with a structure corresponding to the structure of the pointed micro-protrusions 31'.

When the curable resin is epoxy or acrylic, the softening temperature is performed at about 55° C. during softening of the curable resin layer 3'.

Curing and hardening of the curable resin layer 3' can be conducted using a UV light or E-beam heating means.

Since the rounded micro-protrusions 31 of the optical element of this invention form a continuous curved surface 30, the entire light beam emerging from the optical substrate 2 can pass through the rounded micro-protrusions 31, thereby alleviating the aforesaid drawback associated with the prior art.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A method for making an optical element, comprising:
    preparing an optical substrate;
    coating a curable resin on the optical substrate so as to form a curable resin layer on the optical substrate;
    embossing the curable resin layer so as to form a plurality of adjoining pointed micro-protrusions, each of which has a tip end;
    heating the pointed micro-protrusions of the curable resin layer in such a manner that the tip end of each of the pointed micro-protrusions is softened and is spread over the remainder of the respective one of the pointed micro-protrusions so as to form the adjoining pointed micro-protrusions into adjoining rounded micro-protrusions which cooperatively form a continuous curved surface; and
    curing the curable resin layer.

2. The method of claim 1, wherein each of the rounded micro-protrusions has top and bottom ends, and cooperates with adjacent ones of the rounded micro-protrusions to define a recess thereamong, the recess being tapered from the top ends of the respective ones of the rounded micro-protrusions to the bottom ends of the respective ones of the rounded micro-protrusions to form a vertex.

3. The method of claim 1, wherein the embossing of the curable resin layer is conducted using a press-molding plate.

4. The method of claim 1, wherein the optical substrate includes a matrix and a plurality of diffusing particles dispersed in the matrix, the matrix being made from a material selected from the group consisting of polycarbonate, polyester, cyclo-olefin copolymer, and polymethylmethacrylate.

5. The method of claim 1, wherein the curable resin is made from a resin material selected from the group consisting of acrylic, epoxy, acrylic-epoxy, polyurethane, and silicone.

\* \* \* \* \*